3,748,283
METHOD FOR DISPERSING $Cr^{3+}$ IONS
IMPREGNATED IN SILICA
Donald E. O'Reilly, Downers Grove, Ill., and James E. Salamony, Cannon Air Force Base, N. Mex., assignors to the United States of America as represented by the United States Atomic Energy Commission
No Drawing. Filed Jan. 3, 1972, Ser. No. 215,159
Int. Cl. B01j 11/40
U.S. Cl. 252—455 R                                    8 Claims

ABSTRACT OF THE DISCLOSURE

A method for producing delta-phase $Cr^{3+}$ ions impregnated in silica or silica-alumina comprising forming a solution of oxalic acid and chromium nitrate, impregnating the silica or silica-alumina with this solution, heating and oxidizing the impregnated material so as to decompose the nitrate and oxalic acid respectively, and reducing the heated impregnated material to form $Cr^{3+}$ ions.

CONTRACTUAL ORIGIN OF THE INVENTION

The invention described herein was made in the course of, or under, a contract with the United States Atomic Energy Commission.

BACKGROUND OF THE INVENTION

This invention relates to the formation of catalysts comprising metal ions supported on silica or silica-alumina. More particularly, the invention relates to the formation of chromia impregnated in silica or silica-alumina. Specifically, the invention is concerned with a method of formation which disperses the chromia ions within the supporting silica or silica-alumina matrix.

Metal ion catalysts supported by silica, silica-alumina or alumina are used quite extensively in a variety of commercial processes. One particular catalyst system utilizes the chromia ion with the common oxidation states of $Cr^{6+}$, $Cr^{5+}$, $Cr^{4+}$, $Cr^{3+}$ and $Cr^{2+}$. Both $Cr^{3+}$ and $Cr^{5+}$ ions supported on silica, silica-alumina or alumina have been studied extensively, and it has been determined through electron paramagnetic resonance (EPR) spectroscopy that $Cr^{3+}$ ions are present in two distinct phases. One phase is termed the beta-phase wherein the $Cr^{3+}$ ions are present in clusters, while the delta-phase represents $Cr^{3+}$ ions which are dispersed within the supporting matrix and thereby isolated from one another. Both phases are present in varying concentrations in a silica or silica-alumina supported $Cr^{3+}$ ion catalyst, these concentrations being dependent upon total chromia concentration as well as the temperature to which the catalyst is subjected. Utilizing known EPR techniques, it has been determined that the beta-phase greatly predominates when the total chromia concentration is greater than 0.1 weight percent.

There are a variety of chemical reactions which specifically utilize the delta-phase $Cr^{3+}$ ions impregnated in silica, silica-alumina or alumina. One such reaction is the oxidation of $Cr^{3+}$ ions to form $Cr^{5+}$ ions impregnated in silica or silica-alumina which in turn is utilized as a catalyst in an important commercial process for the polymerization of ethylene. It has been determined that the $Cr^{5+}$ ion catalyst is produced almost exclusively from the oxidation of delta-phase $Cr^{3+}$ ions. It is logical, then, that if the delta-phase $Cr^{3+}$ ion concentration could be increased, or in other words if the $Cr^{3+}$ ions could be further dispersed within the silica or silica-alumina support, the respective increase in $Cr^{5+}$ ion concentration would result in a much more efficient and effective catalyst. This would be similarly true of other processes which utilize the delta-phase $Cr^{3+}$ ions impregnated in silica or silica-alumina either as a catalyst or as a starting material in a product formation process. As can be seen from the above, though, the delta-phase $Cr^{3+}$ ion concentration cannot be increased merely by increasing the total chromia concentration within the silica or silica-alumina support. In fact, the delta-phase $Cr^{3+}$ ion concentration decreases with such increases in total chromia concentration. However, we have discovered a method whereby the concentration of the delta-phase $Cr^{3+}$ ions impregnated in silica or silica-alumina is increased by a factor of about 8 over the concentrations obtained from previous methods of producing silica or silica-alumina supported chromia catalysts, and this increase in delta-phase $Cr^{3+}$ ion concentration occurred with the total chromia concentration being considerably greater than 0.1 weight percent.

Therefore, it is an object of this invention to provide a method for producing delta-phase $Cr^{3+}$ ions impregnated in silica or silica-alumina.

It is a further object of this invention to provide a method for dispersing the $Cr^{3+}$ ions impregnated in silica or silica-alumina so as to increase the concentration of delta-phase $Cr^{3+}$ ions by a factor of about 8.

SUMMARY OF THE INVENTION

A method for forming a catalyst of $Cr^{3+}$ ions impregnated in silica or silica-alumina wherein the $Cr^{3+}$ ions are predominantly in a dispersed state comprising forming a solution of oxalic acid and chromium nitrate in a 3 to 1 molar ratio, impregnating the silica or silica-alumina with this solution, exposing the impregnated material to an oxidizing gas so as to decompose the oxalic acid while simultaneously heating said impregnated material to decompose the nitrate, and finally exposing the heated impregnated material to a reducing gas so as to lower the oxidation state of the chromium ions, leaving the silica or silica-alumina impregnated with $Cr^{3+}$ ions.

DETAILED DESCRIPTION OF THE INVENTION

In accordance with the preferred embodiment, three moles of oxalic acid were mixed with one mole of chromium nitrate. This quantity may be increased or decreased according to the amount of resulting catalyst desired, but the molar ratio should remain at about 3 to 1. This is due to the large stability constant of the 3 to 1 complex ion, $Cr(C_2O_4)_3^{3-}$, formed by the oxalic acid and chromium nitrate and is indicative of the exceptional stability of this complex ion.

The catalyst support material was then impregnated with this solution. The support material used in the preferred embodiment was silica gel, $SiO_2$, which is an amorphous solid with a large specific surface area, 100 to 600 m.$^2$g.$^{-1}$ (BET). However, silica-alumina would function just as well due to the presence of a high percentage of silica. The silica utilized in the present embodiment had a specific surface area of 210 m.$^2$g.$^{-1}$. Some other well-known oxides which can be prepared with large surface areas and utilized as catalyst supports are alumina ($Al_2O_3$), magnesia (MgO) and zinc oxide (ZnO). To impregnate the silica with the oxalic acid-chromium nitrate solution, about 2.5 ml. of the solution was thoroughly mixed with 100 ml. silica and then dried at about 250° C. for 10 hours. The amount of solution utilized per 100 ml. silica can vary according to the total chromia concentration desired. The present embodiment resulted in a 0.46 weight percent $Cr^{3+}$ ion concentration.

For testing purposes, the impregnated silica was placed in a 4 mm. O.D. quartz tube wtih one end sealed. Quartz was chosen because it does not interfere with EPR measurements. The tube was filled with the impregnated silica to a height of 10 cm., and a constriction was then placed in the open end of the tube. Glass wool was placed in the tube above the constriction, and the tube was then connected to a vacuum system through a quartz to Pyrex graded seal. In practice, any type of container which is equipped for evacuation to $10^{-6}$ torr may be utilized in the present invention.

The impregnated silica was then degassed by heating it to about 500° C. and evacuating the tube to about $10^{-6}$ torr. The temperature throughout the remaining sequence of steps was maintained at this temperature to decompose the nitrate. The silica was then exposed to 100 torr of oxygen for one hour. This oxidation caused a decomposition of the oxalic acid to carbon dioxide and water vapor which were removed by a second degassing at a vacuum of about $10^{-6}$ torr. The silica was then exposed to about 50 torr of hydrogen gas for about one hour. The impregnated silica was once again degassed at $10^{-6}$ torr and then exposed to a fresh 50 torr charge of hydrogen for another hour. This hydrogen reduction of the impregnated silica resulted in the lowering of the chromium ions' oxidation state to $Cr^{3+}$ so as to leave only the $Cr^{3+}$ ions impregnated in the silica. This reduction is necessary due to the fact that the oxidation step, while oxidizing and removing the oxalic acid, also increases the oxidation state of the chromium ions. The time periods of oxidation and reduction were chosen only as estimates and are not critical to the invention. These periods may be as short as 15 to 20 minutes or as long as desired.

EPR measurements were then made with the $Cr^{3+}$ ion impregnated silica. The EPR signal at $-160°$ C. consisted only of the delta-phase $Cr^{3+}$ ions and was integrated to yield a number proportional to the number of delta-phase $Cr^{3+}$ ions, that number being $15.8 \times 10^{16}$. It should be noted that this number is based on arbitrary vertical and horizontal units of the EPR chart paper, and it is purely the proportional relationship which is important. Comparison of this number with the corresponding number for a $Cr^{3+}$ impregnated silica sample of nearly the same total chromia concentration without the oxalic acid complexing, that number being $1.95 \times 10^{16}$, showed that the delta-phase concentration was increased by a factor of about 8 by utilizing the present method. Chemical analysis of the final $Cr^{3+}$ ion impregnated silica for carbon yielded only 340 p.p.m. of carbon, demonstrating that essentially all of the oxalic acid was decomposed by the oxidation at 500° C.

Prior to the present invention, the usual method for producing $Cr^{3+}$ ion impregnated silica or silica-alumina catalyst comprised impregnating the silica gel or silica-alumina with chromium nitrate or chromium trioxide solution and then reducing the impregnated material. Although it is not known exactly why the present invention resulted in the unexpected increase in the delta-phase, it is believed that by complexing the chromium nitrate with the oxalic acid prior to impregnation of the silica, the large and very stable complex ion resulted in considerable spacing between the $Cr^{3+}$ ions. When the oxalic acid was decomposed, the $Cr^{3+}$ ions retained their positions and therefore effected a dispersion of the $Cr^{3+}$ ions and consequent increase in the delta-phase concentration.

This increase in the delta-phase concentration was unexpected in view of the 0.46 weight percent total chromia concentration utilized. As previously mentioned, the delta-phase concentration had always decreased and the beta-phase predominated utilizing the previous production methods once the total chromia concentration was greater than 0.1 weight percent. Therefore, the present invention enables an increase in the dispersion of the $Cr^{3+}$ ions in the silica or silica-alumina support while increasing the total chromia concentration of the catalyst.

The ability to increase the delta-phase $Cr^{3+}$ ion concentration of a silica or silica-alumina supported chromia catalyst is not only important to the previously mentioned process for polymerization of ethylene, but it is believed that other processes which utilize catalysts may also benefit from the present invention. For instance, platinum supported on alumina is a well-known and important catalyst. A normal procedure for forming this catalyst involves the impregnation of the alumina with chloroplatinic acid, heating and reduction to form $Pt^{4+}$ ions impregnated in alumina. Since platinum is a precious metal, it is reasonable to assume that maximum utilization with a minimum amount of platinum would be extremely desirable. One way of effecting this would be to achieve a maximum dispersion of the $Pt^{4+}$ ion within the alumina. Diamminedinitrato platinum, alpha form, combines with oxalic acid to form a rather large and stable complex ion, $Pt(NH_3)_2(HC_2O_4)_2$. If the alumina were to be impregnated with this in lieu of chloroplatinic acid, the oxalic acid oxidized followed by the normal heating and reduction, a considerably greater dispersion of the $Pt^{4+}$ ions would most likely be achieved. Other important chemical reactions involved in processes such as dehydrogenation of paraffinic hydrocarbons and recently the removal of pollutants from automobile exhaust might also benefit by utilizing the present invention to disperse the metal ions used as catalyst. The complete impact and utilization of the present invention, however, is yet to be determined.

It will be understood that the invention is not to be limited to the details given herein but that it may be modified within the scope of the appended claims.

The embodiments of the invention in which an exclusive property or privilege is claimed are defined as follows:

1. A method of forming $Cr^{3+}$ ions dispersed in a high specific surface area support material containing silica which increases the dispersion of the $Cr^{3+}$ ions therein comprising forming a solution of oxalic acid and chromium nitrate, impregnating said support material with said oxalic acid-chromium nitrate solution, exposing said impregnated support material to an oxidizing gas to oxidize said oxalic acid to carbon dioxide and water vapor thereby removing it from said impregnated support material while simultaneously heating said impregnated support material to decompose the nitrate, and exposing said heated impregnated support material to a reducing gas to lower the oxidation state of the chromium ions impregnated therein to leave only $Cr^{3+}$ ions impregnated in said support material thereby forming delta-phase $Cr^{3+}$ ions therein.

2. The method according to claim 1 wherein said high specific surface area support material is silica gel or silica-alumina.

3. The method according to claim 2 wherein said high specific surface area support material is silica gel having a specific surface area of from 100 to 600 m.$^2$g.$^{-1}$.

4. The method according to claim 1 wherein the molar ratio of said oxalic acid and chromium nitrate is 3 to 1.

5. The method according to claim 4 wherein said high specific surface area support material is silica gel.

6. The method according to claim 5 wherein said oxalic acid-chromium nitrate solution is impregnated in said silica gel by thoroughly mixing about 2.5 ml. of said solution with every 100 ml. silica and subsequently drying said mixture for about 10 hours at approximately 100° C.

7. A method for producing delta-phase $Cr^{3+}$ ion impregnated silica gel comprising forming a solution of oxalic acid and chromium nitrate in a molar ratio of 3 to 1, impregnating silica gel with said oxalic acid-chromium nitrate solution, placing said impregnated silica in a container, heating said silica to about 500° C. while evacuating the container to about $10^{-6}$ torr, said temperature being maintained throughout the remainder of the process to decompose the nitrate, exposing said impregnated silica to oxygen for about one hour at approximately 500° C.

to oxidize said oxalic acid to carbon dioxide and water vapor thereby removing it from said impregnated silica, and evacuating the container to about $10^{-6}$ torr at approximately 500° C. two additional times, exposing said impregnated silica to hydrogen gas for about one hour at approximately 500° C. after each said additional evacuation to lower the oxidation state of said chromium ions to leave only $Cr^{3+}$ ions impregnated in said silica thereby forming delta-phase $Cr^{3+}$ ion impregnated silica gel.

8. The method according to claim 7 wherein said oxygen pressure is 100 torr and said hydrogen pressure is 50 torr.

References Cited

UNITED STATES PATENTS 2,984,653   5/1961   Witt _____ 252—458 X

CARL F. DEES, Primary Examiner

U.S. Cl. X.R.

252—458